Jan. 18, 1955  W. C. EAVES ET AL  2,699,955
TRUCK SPLASH GUARD
Filed Oct. 24, 1952
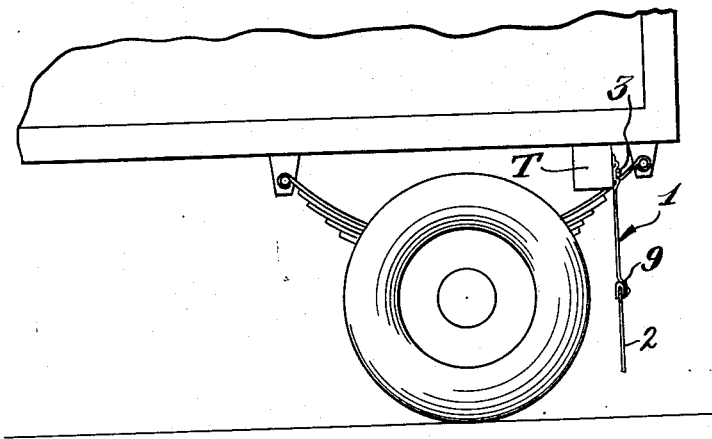
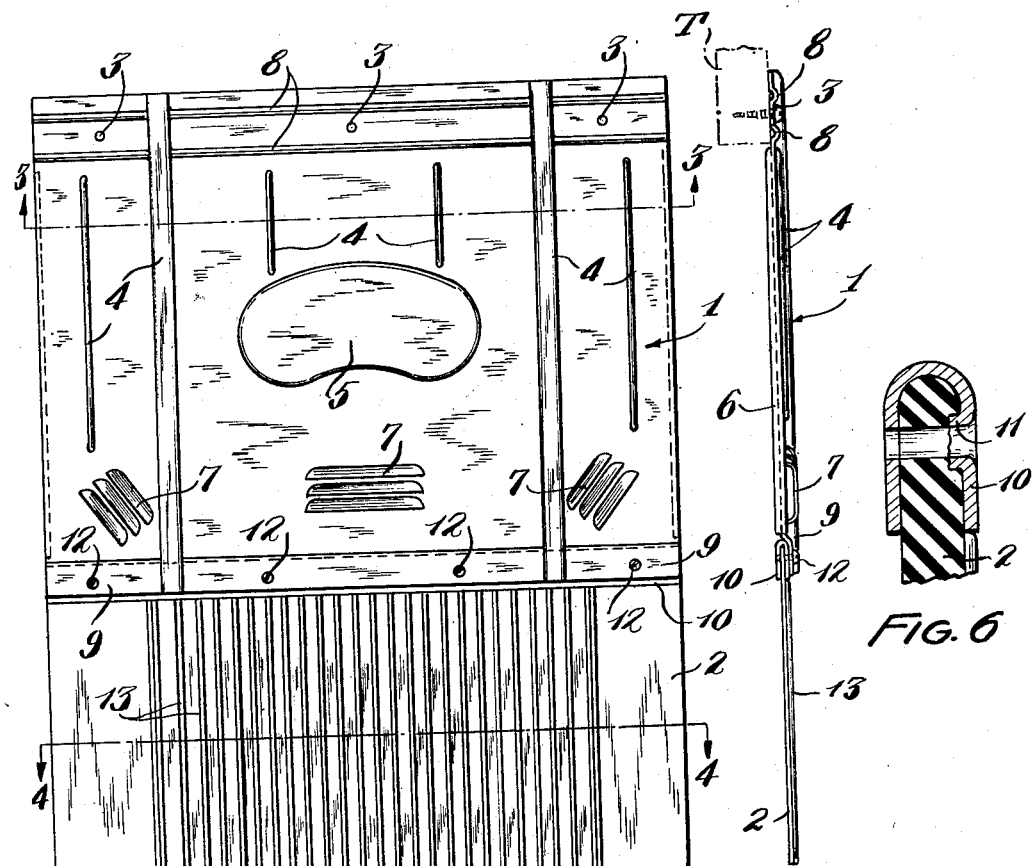
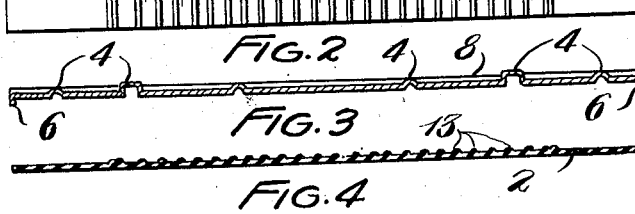
FIG. 5 INVENTORS
WILLIAM C. EAVES
BY RICHARD W. WHITEHILL
ATTORNEYS

United States Patent Office 2,699,955
Patented Jan. 18, 1955

2,699,955

TRUCK SPLASH GUARD

William C. Eaves, Elyria, and Richard W. Whitehill, Cleveland, Ohio; said Whitehill assignor to said Eaves Application October 24, 1952, Serial No. 316,726

4 Claims. (Cl. 280—154.5)

This invention relates to an improved splash guard for use in connection with the rear wheels of an automobile truck, truck tractor or truck trailer.

It is of course well known that splash guards have heretofore been made entirely of rubber or entirely of metal and that they have both proved very unsatisfactory. Particular attention is here given to the all-rubber splash guard which has been considered to be more practical than the all-metal one.

The familiar all-rubber splash guards, in sizes from 24 inches by 30 inches to 24 inches by 40 inches, have been fastened at the upper edge thereof to the truck, tractor or trailer body so as to be suspended in the region immediately to the rear of the rear wheels. When mounted in such manner, the full weight of the guard hangs from its point of suspension and the weight of a rubber body that is sufficiently thick to withstand the beating of the rocks, gravel, water, ice, snow, etc. thereagainst from the roadway, must be considerable. Such a rubber guard is generally from one-quarter to five-sixteenths of an inch in thickness; and in a rubber guard of the required expanse, this thickness means a weight up to from ten to fourteen pounds for each guard.

In the case of a guard of such heavy rubber, a small tear or cut in its edge will be aggravated by its weight; and with the continued flapping and snapping of the rubber body due to the air pressure during travel and the beating of the rearwardly flying debris from the roadway and wheels against the guard, such a small tear or cut may soon grow larger with the danger of a substantial portion of the rubber body being torn completely off.

Also the weight of such a heavy body of rubber tends to produce a stiffness in the guard and there may soon develop a series of vertical or lateral wrinkles that in time will take a "set," with the result that the rubber body becomes distorted, weakened and stiff and hence much less efficient as a splash guard and more readily damaged by tearing or ripping of the same.

Such a rubber guard may also be damaged beyond the point of practical usefulness as a result of the same being caught and ground or torn between a high curb stone or other obstruction and the wheel of a backing truck.

When the truck is traveling, an all-rubber guard is of course subjected to a substantial force of the air or wind, which causes it to "sail" or to "tail gate"; and, as a result, the very purpose of the guard is defeated as the foreign matter from the roadway and wheels will pass therebeneath. Also, such constant up and down bending movement of the guard causes tearing and breaking of the same.

It has been found also that the impact of heavy rain or slush upon the solid rubber guard will tend to cause the edges of the same to curl back, thereby contributing to the danger of the tearing of the edge portions of the guard and also increasing the danger of throwing a spray laterally from the guard towards a passing vehicle, which of course is a potential hazard especially in the case of heavy rain, slush or other such foreign matter from the roadway.

As will of course be understood, the old form of heavy all-rubber guard is costly to renew and, since the average life of such a guard in daily use is only approximately ninety days and since such guards are required by law in many States, this is an item of considerable expense for an active truck or for an owner of a fleet of trucks.

Splash guards made entirely of metal have also been found to be objectionable because of their lack of flexibility, their weight, their cost, the packaging of the same, the inherent element of danger in the use of the same, and because of other inefficiencies that are peculiar to an all-metal form of device for this purpose.

Accordingly, it is the general object of our present invention to devise a truck splash guard that is capable of relieving all of the several objections above noted in connection with both the all-rubber and the all-metal splash guards.

More specifically, one object of our invention is to devise a truck splash guard that consists of an upper part of comparatively rigid light sheet metal and a lower part of comparatively light flexible rubber.

Another object is to device an improved splash guard which consists of an upper part of metal and a lower part of rubber and in which the vertical extent of the metal part may be substantially greater than that of the rubber part.

Another object is to devise such a splash guard which includes an upper metal part and a lower rubber part and in which the lower rubber part is readily removable from the upper metal part so as to facilitate packaging and also to permit the lower part to be renewed at any time.

Another object is to devise such a splash guard with means for substantially reducing the danger of rain, slush or the like being deflected laterally towards a passing vehicle.

Another object is to devise such a splash guard with means for preventing the same from "sailing."

Another object is to devise such a splash guard that is so constructed as to increase its efficiency in general and to lengthen its life of usefulness and also to prove more economical than those heretofore in use.

Other objects will appear from the following description and claims when considered together with the accompanying drawing.

Fig. 1 is a side elevation illustrating the installation of our present improved device;
Fig. 2 is a rear elevation of the device itself;
Fig. 3 is a sectional view taken on line 3—3 of Fig. 2;
Fig. 4 is a sectional view taken on line 4—4 of Fig. 2;
Fig. 5 is an enlarged elevation of the splash guard itself corresponding to Fig. 1; and
Fig. 6 illustrates the attachment of the inverted U-shaped channel strip to the upper edge of the rubber part of the splash guard so as to facilitate handling, application, removal and renewal of the lower part of the guard.

Referring now to the accompanying drawing in detail, our present improved form of splash guard consists of an upper part 1 of comparatively rigid light sheet metal and a lower part 2 of flexible comparatively light weight rubber or the like, these two parts being detachably connected together.

The upper part 1 may be attached in the usual manner at its upper edge portion to a transverse part T of a truck, truck tractor or trailer, as indicated at 3. The sheet metal part 1, which is of substantially greater vertical extent than the lower rubber part 2, is provided with embossed vertically extending reinforcing ribs 4 in its end and upper portions. The longer ribs 4 are also wider and may extend the full height of the metal part 1. The metal part 1 has also a reinforcing embossed portion 5 in the middle thereof for a name (not shown) that may also be embossed and that will also serve as an added means of reinforcement.

The vertical edges of the upper part 1 may be turned forwardly, as at 6, for the purpose of deflecting forwardly the water, slush, etc. that might otherwise be thrown laterally towards a passing vehicle. The flanged edge portions 6 may be at an angle of at least ninety (90) degrees, it being understood that this angle may be varied according to choice and judgment. The flanged portions 6 will serve also as a reinforcing means for the light sheet metal part 1. The angularly disposed outwardly and downwardly opening louvres 7 in the lower corner portions of the part 1 will permit passage of the water and slush therethrough and will relieve air pressure so as to reduce the danger of "sailing" of the splash guard. Likewise the horizontal louvres 7.

In the lower portion of the metal part 1 there is provided a transverse off-set 9 to accommodate the reinforced upper edge portion of the lower part 2 of the guard. This reinforcement consists of an inverted U-shaped channel metal member 10 which may extend the entire width of the lower rubber part 2 and which may be attached thereto preliminarily so as to form a unitary part thereof before being attached to the upper part 1. This preliminary attachment may be effected by placing the edge of the rubber part 2 within the channel member 10 and then punching holes therethrough at intervals in such manner that the metal will be extruded from the near side of the U-shaped member into the openings punched into the rubber, as indicated by reference numeral 11. This will serve to hold the U-shaped member 10 upon the rubber part 2 so that these two elements may be recognized and conveniently handled as a unit. Then, upon placing this unit in position with its reinforced upper edge portion in the lower off-set 9 of the upper part 1, the parts 1 and 2 may be secured together by means of screws or bolts 12 through the same preliminarily formed holes just referred to.

The rubber part 2 may be provided with the vertical reinforcing ribs 13, formed integrally therewith, as a further means of reinforcement.

The lower rubber part 2 may be of different heights and thus it is possible to provide the proper over-all height for the splash guard which might vary in trucks of different heights and clearances, while the height of the upper metal part 1 may be a constant.

Since the rubber part 2 of the present invention is of substantially reduced height, as compared with the old all-rubber splash guard, it can be made of comparatively light-weight rubber with the result that it is not only of lighter weight but is more flexible and hence better adapted for efficient service over a more prolonged period of time.

With this combination of metal and rubber, the rubber part is relieved in large measure of the destructive forces to which all-rubber guards are subjected. Also, in case the lower part 2 should be damaged by backing into a high curb or the like, as above explained, that part alone may be readily removed and renewed by another unit at any time and without having to renew or even remove the upper metal part 1 from the truck.

With our combination splash guard, there is provided metal in the region where there is apt to occur the greatest wear and tear due to suspension and shearing action; and there is provided rubber in the lower region of the guard where flexibility is necessary and where there is the greatest danger of destructiveness of road and wheel hazards.

This combined metal and rubber splash guard greatly facilitates the original installation as well as up-keep of the same, for the further reason that less bracketing is required for mounting the same upon the truck.

Due to the sectional construction of our present splash guard, the previous problem of packaging and storing the all-rubber or all-metal guard is greatly eased.

Thus we have devised a splash guard that possesses the desirable characteristics of an all-metal guard and of an all-rubber guard but without the undesirable characteristics of either of these other two forms of splash guards.

It is to be understood that the present form of disclosure is merely for the purpose of illustration and that there might be devised various modifications thereof without departing from the spirit of our invention as herein set forth and claimed.

In the following claims the term "truck" is not to be interpreted in a limited sense but is here employed as a matter of convenience and is to be understood to comprehend automobile trucks, truck tractors and truck trailers.

What we claim is:

1. A truck splash guard comprising an upper substantially rigid part adapted to be attached at its upper edge to the frame of a truck so as to depend in the region rearwardly of the rear wheel of the truck, and a lower substantially flexible part having its upper edge portion attached to the lower edge portion of said upper rigid part, said upper and lower parts being of combined extent adapted to intercept the throw of foreign matter from the roadway by the rear wheel of the truck, and said upper part having rearwardly and downwardly opening louvres provided therein.

2. In a truck splash guard, a substantially flexible body having a transversely extending upper edge and an inverted U-shaped channel member of substantially rigid material receiving the upper edge portion of said flexible body and attached thereto so as to form a single unit therewith, said channel member being attached to said flexible body by means of extruded edge portions of apertures therein that are adapted to receive means for connecting the same to the lower edge portion of a companion part of a truck splash guard.

3. A truck splash guard comprising an upper substantially rigid sheet metal part adapted to be attached to the frame of a truck so as to depend in the region rearwardly of the rear wheel of the truck, and a lower substantially flexible part of rubber-like material of less vertical extent than said upper sheet metal part and having its upper edge portion enclosed within an inverted U-shaped substantially rigid channel member, the lower edge portion of said upper metal part having a rearward off-set portion within which said channel member is seated, and means for securing said channel member and lower part removably within said off-set portion, said upper and lower parts being of a combined extent adapted to intercept the throw of foreign matter from the roadway by the rear wheel of the truck.

4. A truck splash guard comprising an upper substantially rigid metal part adapted to be attached to the frame of a truck so as to depend in the region rearwardly of the rear wheel of the truck, and a lower substantially flexible part of rubber-like material having its upper edge portion provided with a substantially rigid member attached therealong, the lower edge portion of said upper metal part having an off-set portion therealong within which said rigid member is seated, and means for securing said rigid member and lower flexible part removably within said off-set portion, said upper and lower parts being of a combined extent adapted to intercept the throw of foreign matter from the roadway by the rear wheel of the truck.

References Cited in the file of this patent

UNITED STATES PATENTS

| 1,930,376 | Willett | Oct. 10, 1933 |
| 2,038,234 | Olen | Apr. 21, 1936 |
| 2,441,181 | Bartelheim | May 11, 1948 |
| 2,546,781 | Rheeling | Mar. 27, 1951 |
| 2,619,363 | Wenham et al. | Nov. 25, 1952 |

FOREIGN PATENTS

| 22,564 of 1935 | Australia | Feb. 18, 1936 |
| 107,555 | Australia | May 25, 1939 |
| 373,569 | Great Britain | May 26, 1932 |